United States Patent

[11] 3,628,406

| | | | |
|---|---|---|---|
| [72] | Inventor | Bruce W. Stevens<br>Appleton, Wis. | |
| [21] | Appl. No. | 25,110 | |
| [22] | Filed | Apr. 2, 1970 | |
| [45] | Patented | Dec. 21, 1971 | |
| [73] | Assignee | Menasha Corporation<br>Neenah, Wis. | |

[54] TUBE FEEDING MEANS
11 Claims, 6 Drawing Figs.

[52] U.S. Cl. ................................................... 82/89,
82/90, 82/101, 82/102
[51] Int. Cl. ....................................................... B23b 5/14
[50] Field of Search ............................................ 82/89, 90,
101, 102

[56] References Cited
UNITED STATES PATENTS
460,317  9/1891  Whitney ........................ 82/90

| 1,085,946 | 2/1914 | Seeley et al. .................. | 82/102 X |
| 1,920,881 | 8/1933 | Paton et al. ..................... | 82/102 X |
| 1,925,498 | 2/1931 | Plante ............................. | 82/102 X |
| 2,020,113 | 11/1935 | Ferguson ........................ | 82/102 X |

Primary Examiner—William S. Lawson
Attorney—Johnson, Dienner, Emrich, Verbeck and Wagner ABSTRACT: Tube storage and feeding apparatus for use in a tube-cutting machine having a work station and a reciprocating mandrel adapted to selectively support a tube disposed in the work position, the tube storage and feeding means including a storage bin, a tube-advancing elevator having tube-lifting lugs selectively secured to lift chains movable through driven sprocket shafts, a spiral cam rotatable in direct response to movement of the mandrel, and clutch means operative to effect advancing movement of the lift lugs only during movement of the mandrel to a position removed from the work station of the machine.

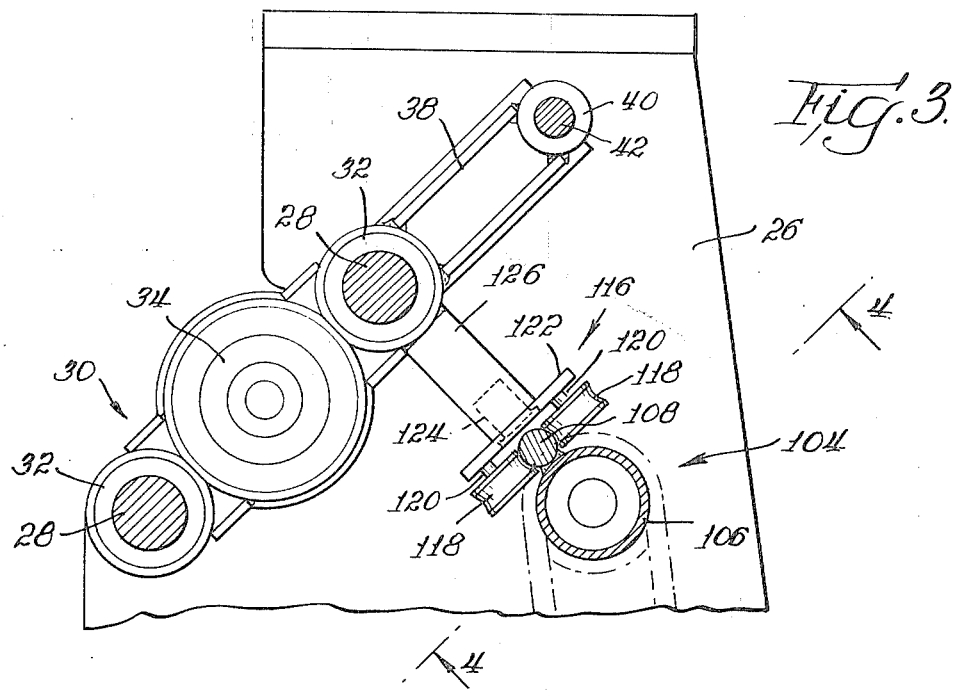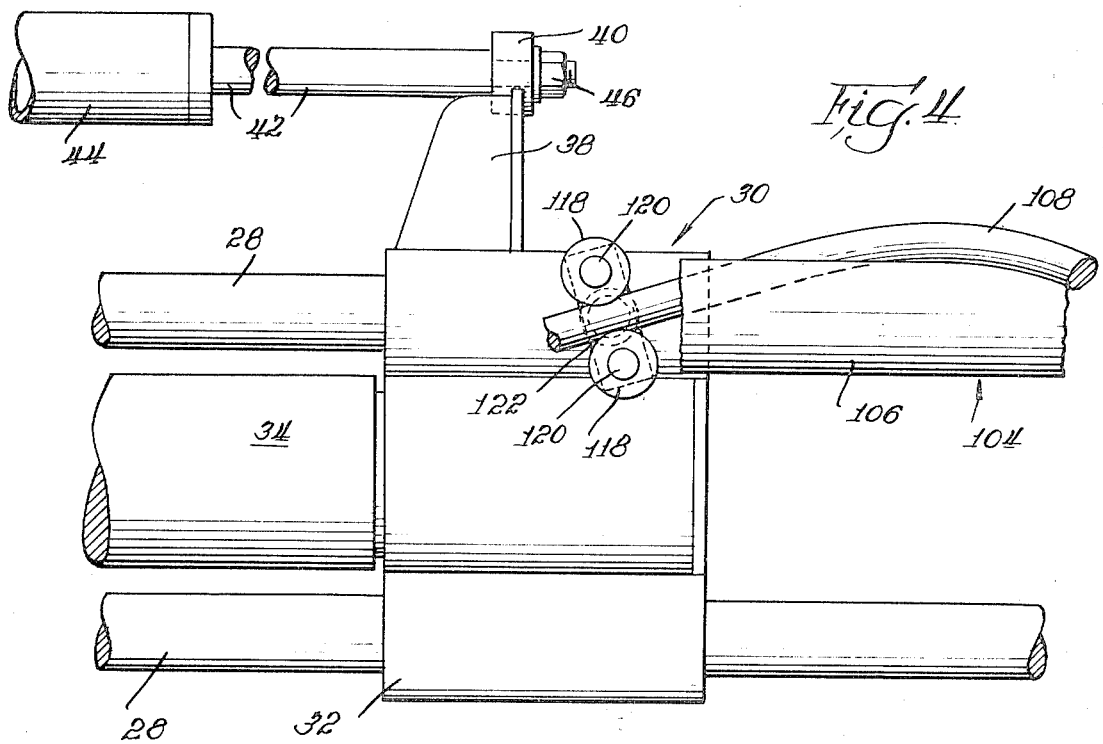

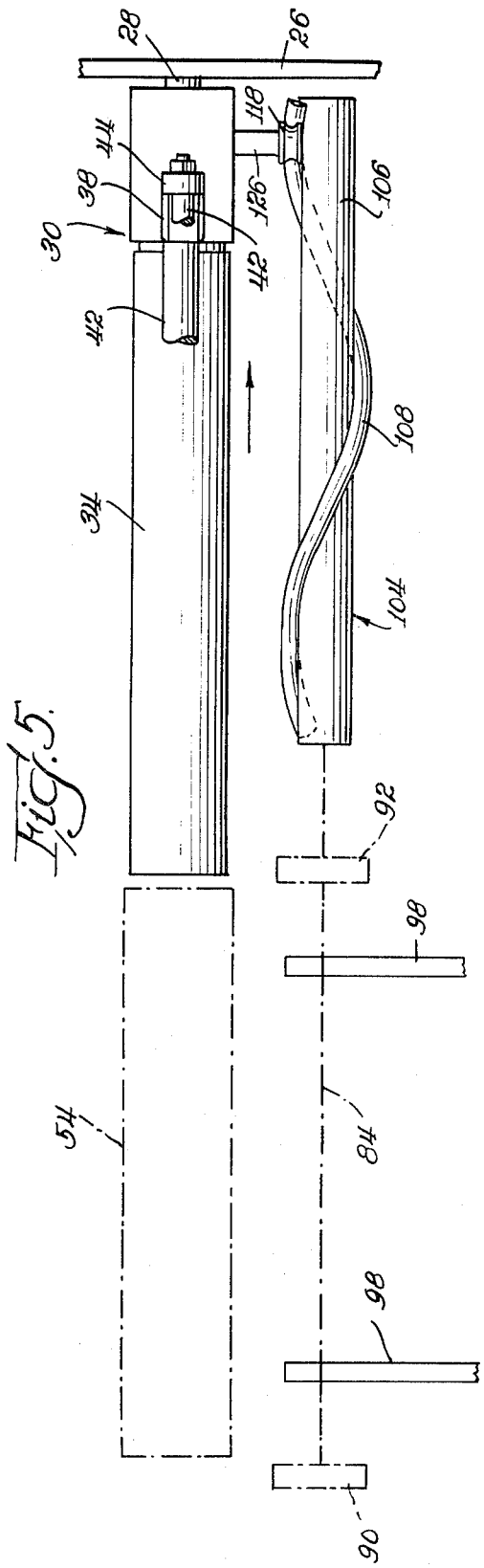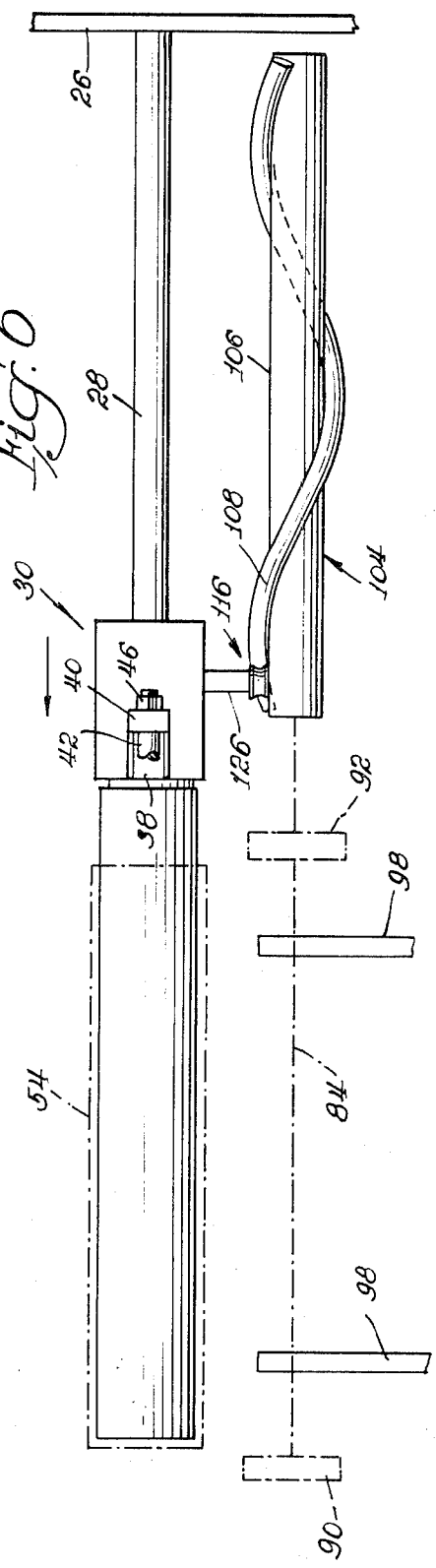

3,628,406

TUBE FEEDING MEANS

BACKGROUND OF THE INVENTION

The present invention relates generally to tube-cutting machines, and more particularly to novel tube storage and feeding means for sequentially advancing lengths of tube stock to a work station in the tube-cutting machine.

Machines for cutting elongated lengths of wound paper tubing and the like into a plurality of shorter tubular sections are generally known. Such machines includes means for supporting an elongated length of tubing and have cutter blades which are movable into cutting relation with the tube to effect cutting or segmenting thereof. The prior art tube-cutting machines have generally employed one or more tube support frame structure, and the tubes are placed onto the mandrels for cutting into shorter length segments.

One known tube-cutting machine employs means for sequentially feeding lengths of uncut tube to a first station, with each tube being thereafter moved longitudinally by means of a movable carriage adapted to load the uncut tube onto a rotatable mandrel preparatory to cutting the tube into shorter segments. Movement of the carriage to a position to load a length of tube onto the mandrel is effected through means having a complex gear and lever arrangement which operates in a relatively inefficient manner and contributes to down time of the machine for repair and adjustment. See, for example, U.S. Pat. No. 1,085,946, dated Feb. 3, 1914.

It has been proposed to provide a tube-cutting machine incorporating a mandrel which is selectively moved longitudinally to receive and support length of tube stock positioned within a work station of the machine preparatory to cutting the tube into shorter length segments. After cutting the tube into shorter segments, the mandrel is returned to a position removed from the work station. During such return movement of the mandrel, tube advancing or feeding means must be operative to advance a new length of uncut tube to the work station. The tube feeding and advancing arrangements heretofore employed with tube-cutting machines have been found to operate ineffectively with a tube cutter having a retractable mandrel as the prior arrangements do not provide adequate means for synchronizing feeding of the uncut lengths of the tube stock to a work station with movement of the mandrel to receive and support a length of tube stock preparatory to cutting the tube into shorter length segments. The present invention fulfills the need for a tube storage and feeding arrangement which can provide sequential feeding of lengths of tube stock to a work station in direct response to longitudinal movement of a mandrel preparatory to cutting the lengths of tube stock into shorter length segments.

SUMMARY OF THE INVENTION

One of the primary objects of the present invention is to provide novel tube storage and feeding means for use with a retractable mandrel tube-cutting machine, which storage and feeding means is adapted to feed lengths of tubular stock to a work station of the machine in direct relation to movement of the mandrel.

Another object of the present invention is to provide tube storage and feeding means adapted to sequentially feed lengths of tubular stock from a storage bin to a work station of a tube-cutting machine having a retractable mandrel adapted to support a tube during cutting thereof, the tube-feeding means being adapted to rapidly feed a tube toward the work station during initial movement of the mandrel from its tube-supporting position toward a retracted position removed from the work station while feeding the tube to the work station at a substantially slower speed as the mandrel approaches its fully retracted position.

Another object of the present invention is to provide tube storage and feeding means as described employing a spiral cam directly coupled to a mandrel support carriage through a cam follower arrangement, the spiral cam being connected to chain supported tube lifting lugs in a manner to effect feeding of tubes to a work station in direct relation to movement of the mandrel.

In carrying out the above objects and advantages of my invention, I provide a tube-cutting machine employing a cylindrical mandrel reciprocally longitudinally movable on a support carriage between a work station of the machine and a position removed from the work station. Tube-feeding means including a pair of sprocket driven endless chains having tube-lifting lugs selectively secured thereon are adapted to advance or feed elongated tubes from a storage bin to the work station. The tube-feeding means includes a spiral cam connected to one of the sprocket-supporting shafts and operative through a cam follower secured to the mandrel carriage for rotational movement in direct relation to movement of the mandrel. Clutch means comprising a one-way clutch interconnected the spiral cam to the sprocket drive shaft to effect sequential feeding of elongated tubes to the work station during movement of the mandrel from a position within the work station wherein the mandrel supports a tube during cutting thereof, to a position removed from the work station. Brake means prevent reverse movement of the tube-feeding means during movement of the mandrel toward the work station preparatory to cutting a length of tube into shorter length segments.

Other objects, features and advantages of my invention will become apparent from the following description of a preferred embodiment when taken in conjunction with the accompanying drawings, in which like reference numerals designate like parts throughout the several views.

BRIEF DESCRIPTION OF THE DRAWINGS

FIG. 3 is an enlarged partial transverse sectional view taken generally along line 3—3 of FIG. 2, looking in the direction of the arrows, and illustrates the mandrel carriage and cam follower in cooperation with the spiral cam;

FIG. 4 is a view taken generally along the line 4—4 of FIG. 3, looking in the direction of the arrows, showing the cam follower operatively associated with the spiral cam;

FIG. 5 schematically illustrates the spiral cam of the tube-feeding mechanism in operative association with the mandrel support carriage, the mandrel being shown in a first position removed from the work station of the machine; and FIG. 6 is a schematic view generally similar to FIG. 5 but illustrating the mandrel in a second position disposed within the work station and supporting an elongated tube to be segmented.

DESCRIPTION OF A PREFERRED EMBODIMENT

Figure 1:
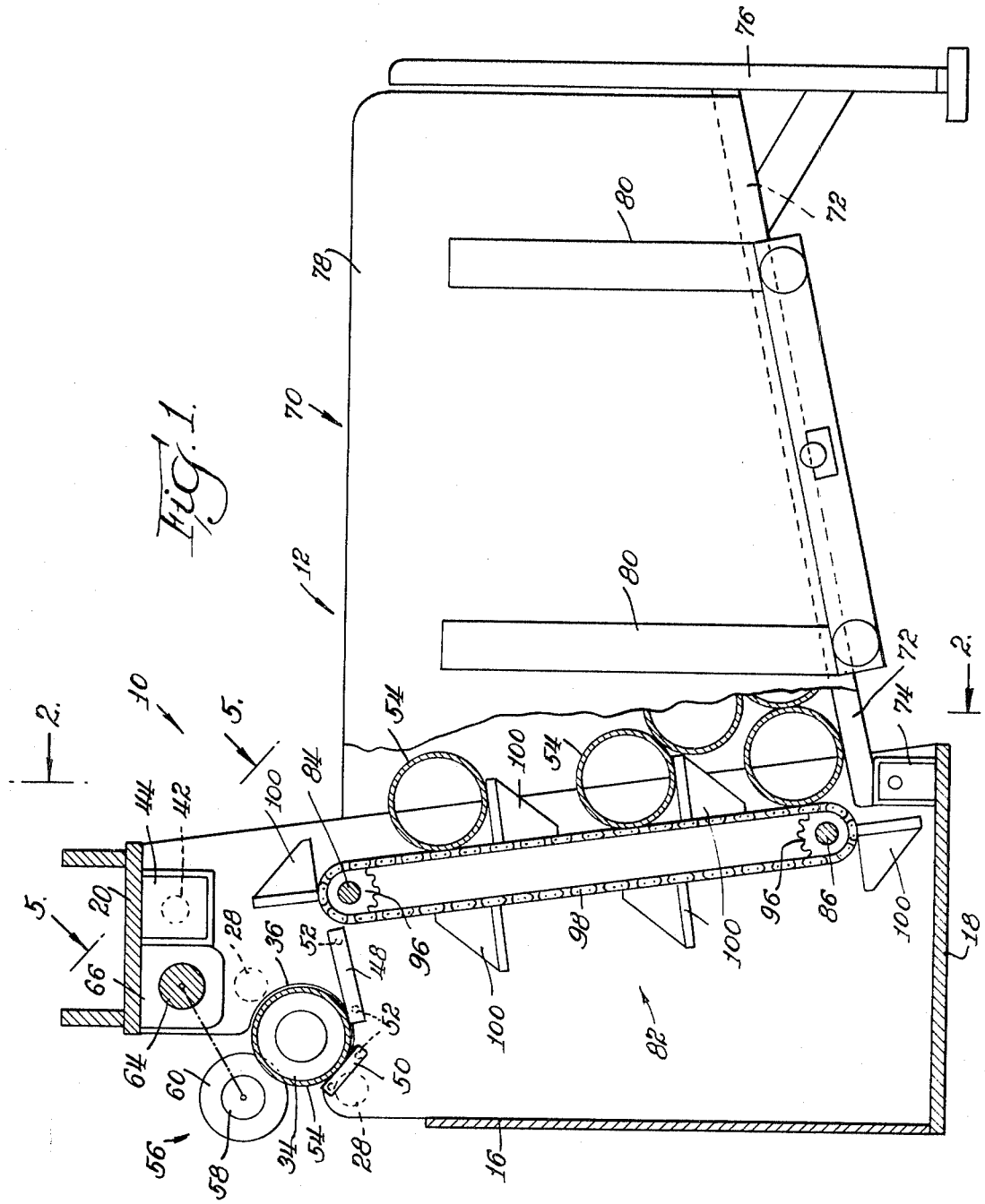
FIG. 1 is an end elevational view, taken partly in section, of a tube-cutting machine having a tube storage and feeding arrangement in accordance with the present invention.
Figure 2:
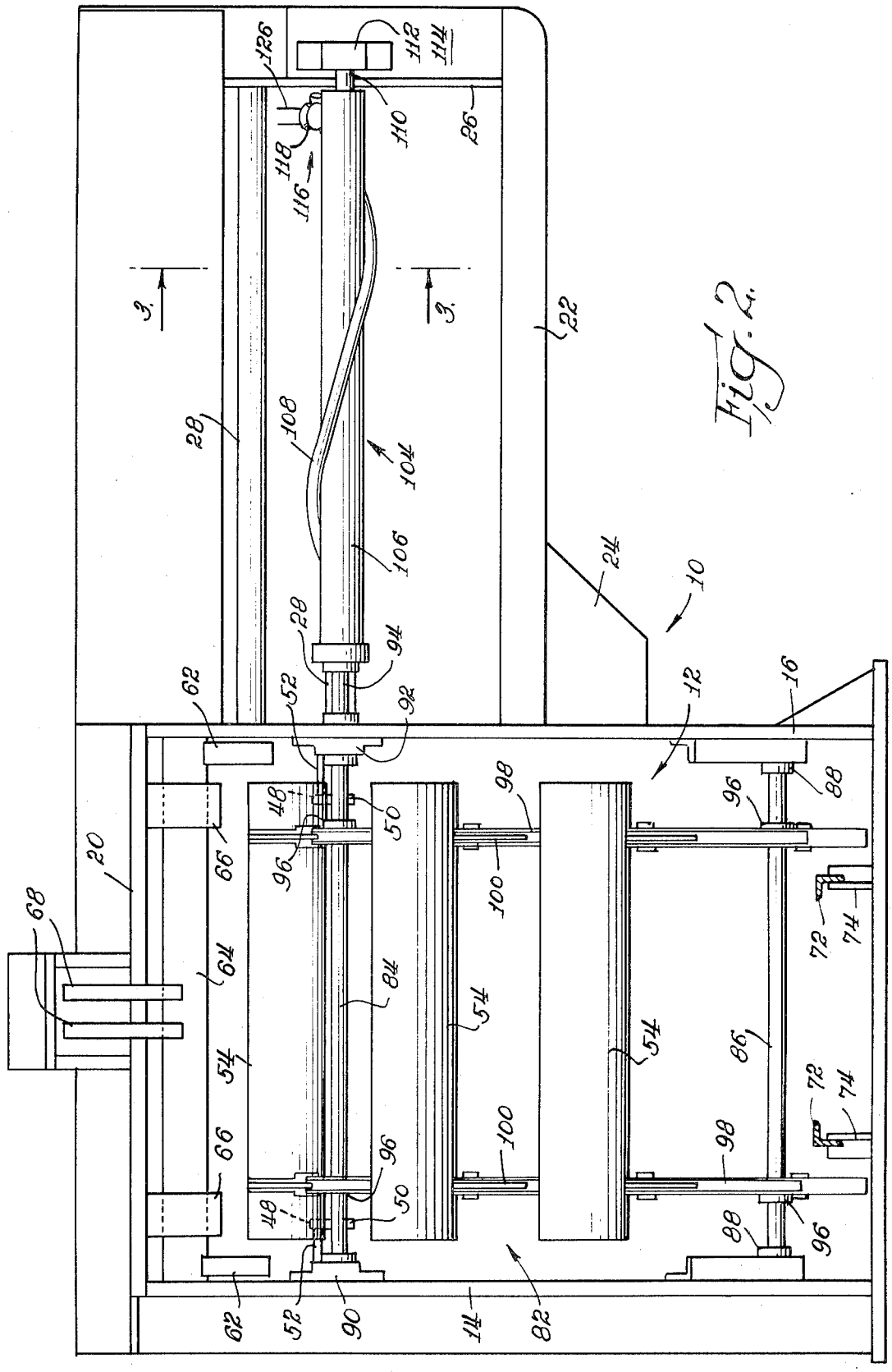
FIG. 2 is a partial sectional view, taken generally along the line 2—2 of FIG. 1, looking in the direction of the arrows.

Referring now to the drawings, and in particular to FIGS. 1 and 2, the present invention is illustrated in combination with a tube-cutting machine indicated generally at reference numeral 10. The present invention is directed to tube storage and feeding means, indicated generally at 12, operatively associated with the tube-cutting machine for sequentially advancing elongated lengths of tube stock to a work station preparatory to cutting them into a plurality of shorter length segments. For purposes of description, only those elements of the tube-cutting machine 10 which are pertinent to a thorough understanding of the tube storage and feeding means 12 will be described in detail herein, it being understood that the present invention will find ready application with various embodiments of tube cutter machines.

The tube-cutting machine 10 includes a support frame comprising a pair of laterally spaced support plates 14 and 16 which are suitably fixedly secured in generally vertical upstanding relation to a floor plate 18. A horizontal frame plate 20 (FIG. 2) is secured to the upper horizontal edge portions of the upstanding support plates 14, 16 as by welding, and serves to maintain the upper portions of the support plates in laterally spaced relation. A support frame 22 is secured in horizontal relation to the upstanding support plate 16 and stabilized through corner plates 24 so as to extend outwardly from plate 16. The horizontal frame 22 supports a vertical plate member 26 in upstanding relation thereon laterally outwardly from the upstanding support plate 16.

A pair of horizontal guideways comprising cylindrical bars 28 have their opposite end portions suitably secured to and supported by the spaced upstanding support plates 16 and 26 such that the guideways are disposed in parallel, spaced horizontal relation. Noting FIGS. 3 and 4, the guideways 28 serve to support a mandrel carriage 30 having journal or sleeve portions 32 each adapted to slidingly receive one of the guideway bars 28 therethrough. The mandrel carriage 30 is adapted to support an elongated cylindrical mandrel 34 in parallel relation to the guideways 28, the mandrel being reciprocally movable with the mandrel carriage 30 in a longitudinal direction along the guideways 28. Noting FIG. 1, the upstanding support plate 16 has a generally semicircular shaped recess 36 provided therein of a size and positioned to allow the mandrel 34 be moved longitudinally along the guideways 28 to a position wherein the mandrel is caused to extend substantially between the parallel support plates 14 and 16. The upstanding support plate 26 is spaced outwardly from the upstanding support plate 16, and the cylindrical mandrel 34 and its associated mandrel support carriage 30 are of sufficient horizontal dimension, to allow the mandrel to be retracted fully outwardly from the upstanding support plate 16, while being movable longitudinally into the above-described position between the support plates 14 and 16.

The mandrel carriage 30 has an arm portion 38 suitably secured to the upper sleeve portion 32. The arm 38 of the mandrel carriage 30 has an annular sleeve 40 secured thereto which provides a means for securing the mandrel carriage to an elongated piston 42 of a conventional pneumatic cylinder-piston assembly 44. The outer end of the piston 42 is suitably fixedly retained within the sleeve 40 through a bolt 46 threadedly secured on a reduced diameter outer end portion of the piston. The pneumatic cylinder-piston assembly 44 is operative in a conventional manner to effect extension and retraction of the piston 42 whereby to control reciprocating longitudinal movement of the mandrel 34 along the guideways 28 as will be more fully described hereinbelow.

Referring to FIGS. 1 and 2, the upstanding support plates 14 and 16 have angularly inclined guide brackets 48 and 50 secured in pairs to the inner opposing surfaces thereof. The guide brackets 48 and 50 are suitably secured to the upstanding support plates 14 and 16 in outwardly spaced relation from the respective opposing surfaces of the spaced support plates as through spacing shafts 52. The guide bracket support shafts 52 are secured to the associated guide brackets 48 and 50 and the support plates 14 and 16 so as to fixedly position the associated pairs of guide brackets in generally planar relation parallel to the support plates with the guide brackets of each pair forming an obtuse included angle therebetween. The opposed pairs of guide brackets 48 and 50 define a work station on the tube-cutting machine 10 and are spaced inwardly from their adjacent support plates 14 and 16 a distance sufficient to receive and support a length of elongated tubular stock 54 as lengths of tube stock are sequentially advanced or fed to the work station of the tube-cutting machine as described hereinbelow. The pairs of guide brackets 48 and 50 serve to guide a length of tubular stock 54 to a position wherein its longitudinal axis is parallel to but slightly vertically below the longitudinal axis of the mandrel 34. The outer cylindrical surface of the mandrel 34 is of a diameter slightly less than the internal diameter of a length of tube stock 54 such that when the mandrel is moved longitudinally to a position within the work station of the machine, the mandrel will enter and support a length of tube stock 54 disposed within the work station as illustrated schematically in FIGS. 5 and 6. In this manner, the mandrel 34 can be moved longitudinally between a first position removed from the work station having a length of tube stock 54 supported therein, as shown in FIG. 5, and a second position within the work station wherein the mandrel receives and supports an elongated tube disposed within the work station, as shown in FIG. 6.

Noting FIG. 1, the cutting machine 10 includes cutting means, indicated generally at 56, for cutting a length of tube stock 54 into shorter length segments when the mandrel 34 is moved to its second position to receive and support a length of tube stock which has been advanced to a position within the work station of the tube-cutting machine. The cutting means 56 may be of generally known design and conventionally comprises an elongated arbor or knife bar 58 having a plurality of circular cutting blades 60 supported in longitudinally spaced relation therealong. The arbor 58 is rotatably supported by a pair of radial arms 62 (FIG. 2) fixedly secured in normal relation to a pivot shaft 64 adjacent the opposite ends thereof. The pivot shaft 64 is rotatably supported in depending journal supports 66 secured to and depending from the upper horizontal support plate 20. Control arms 68 are fixedly secured to the pivot bar 64 in normal relation thereto and are operatively associated with actuating means (not shown) adapted to effect selective rotation of pivot shaft 64 with a resultant radial movement of the cutting blades 60 into cutting engagement with the peripheral surface of a length of tubular stock 54 disposed on the mandrel 34 when in its forward tube-supporting position. The tube cutting means 56, per se, forms no part of the present invention and need not be explained more fully herein, it being understood that any conventional cutter means may be utilized in conjunction with the tube-cutting machine 10 to effect cutting of an elongated length of tube stock 54 into a plurality of shorter length segments. It will be further understood that movement of the cutter means 56 into cutting engagement with a length of tube stock 54 disposed upon the mandrel 34 within the work station of the machine 10 may be automatically synchronized with control of the mandrel 34 longitudinally into and out of the work station.

The tube storage and feeding means 12 includes storage bin means, indicated generally at 70 (FIG. 1), adapted to store a plurality of lengths of elongated tubular stock 54 preparatory to advancing the lengths of the tube stock to the work station of the cutting machine 10 as defined by the opposed pairs of guide bars 48 and 50. The storage bin means 70 comprises a hopper having a pair of spaced parallel inclined L-shaped frame members 72 secured at their forward ends to he floor plate 18 through cooperating spaced support channels 74, and secured at their rearward ends to an upstanding frame 76. The frame members 72 may support a generally planar baseplate therebetween which is inclined downwardly toward the floor plate 18 of the tube-cutting machine. The storage hopper includes upstanding parallel sideplates, one of which is shown at 78, secured to upstanding brackets 80 which are affixed to the frame members 72. The sideplates 78 of the storage hopper lie in planes normal to the axis of mandrel 34 and are spaced laterally apart a distance sufficient to receive a plurality of lengths of tube stock 54 and maintain the tubes in positions such that their longitudinal axes are generally normal to the sideplates 78. The incline of the base frame members 72 of the storage hopper urges the stored lengths of the tube stock in a direction toward the cutting machine 10, or from right to left as considered in FIG. 1.

The tube storage and feeding means 12 further includes tube-advancing means, indicated generally at 82, operatively associated with the storage means 70. The tube-advancing means 82 includes a pair of spaced-parallel cross-shafts 84 and 86 which are supported by and between the upstanding support plates 14 and 16 in normal relation thereto. The lower crossbar 86 is rotatably supported by the upstanding support plates 14 and 16 through suitable bearings 88. The upper cross-shaft 84 is supported at its opposite ends through a pair of conventional one-way clutches 90 and 92 which are secured, respectively, to the support plates 14 and 16. The supporting clutch 90 is of the known overrunning type adapted to allow free rotational movement of the cross-shaft 84 in a counterclockwise direction, as considered in FIG. 1, while preventing rotational movement of the shaft 84 in a clockwise direction. The supporting clutch 92 is also of the overrunning type, such as a Sprag-type clutch, and is operatively coupled to the cross-shaft 84 and to a second axially aligned drive shaft 94 in a manner such that rotation of shaft 94 in a counterclockwise direction effects counterclockwise rotation of cross-shaft 84, as considered in FIG. 1, but rotation of shaft 94 in an opposite (clockwise) rotational direction is ineffective to transmit rotational movement to the cross-shaft 84 due to the overrunning feature of the clutch 92.

The parallel-spaced cross-shafts 84 and 86 fixedly support pairs of sprockets 96 in longitudinally spaced relation thereon for conjoint rotation with the cross-shafts. The sprockets 96 are positioned on the cross-shafts 84 and 86 such that each sprocket lies in cross-shafts normal to the axes of the cross-shaft and containing a corresponding sprocket on the opposite cross-shaft to establish cooperating pairs of sprockets. Each such pair of sprockets supports and endless chain 98 in cooperating relation therewith such that rotational movement of either of the cross-shafts 84 effects a corresponding movement of the associated endless chains 98.

The endless chain 98 support tube lifting means comprising a plurality of tube lifting lugs 100 generally equidistantly spaced along the lengths of the endless chains. The tube lifting lugs 100 are positioned on the endless chains 98 in a manner to provide laterally spaced pairs of tube lifting lugs which cooperate to engage and lift an elongated length of tube stock 54 as the tube lifting lugs are caused to move with the endless chains. The base support plate of the tube storage bin 70 is suitably recessed at its lower end adjacent the floor plate 18 of the tube-cutting machine to allow unrestricted movement of the tube lifting lugs 100 into engagement with the lengths of tube stock during operation. Each of the tube-lifting lugs 100 is of generally triangular shape, considered in side profile, and is secured to one of the links of the associated endless chain 98 so as to be moved along the path of the chain responsive to movement of the associated chain link. Noting FIGS. 1 and 2, it can be seen that rotational movement of either of the cross-shafts 84 or 86 will effect movement of the associated endless chains 98 with corresponding movement of the tube lift lugs 100 to sequentially engage and advance lengths of tube stock 54 from the storage bin 70 to a position adjacent the uppermost cross-shaft 84. As the lengths of tube stock are sequentially raised to the uppermost height of the endless chains 98, as established by the upper sprockets 96, the opposite end portions of the lengths of tube stock will engage the inclined guide brackets 48 and move to the work station of the tube-cutting machine by gravity.

The tube-advancing means 84 includes drive means operatively associated with the upper cross-shaft 84 for effecting selective rotary movement of the upper cross-shaft in a direction to sequentially advance lengths of tube stock 54 to the work station defined by the angularly inclined guide brackets 48 and 50. Such drive means includes a spiral cam, indicated generally at 104, comprising en elongated cylindrical member 106 having a cam member 108 of circular cross section suitably secured to the peripheral surface of the cylinder 106 and spirally wound therebout as illustrated in FIG. 2. The cylinder member 106 may be of solid cross section or tubular to reduce weight and has one end formed integral with or otherwise suitably affixed to the aforedescribed drive shaft 94 in axial alignment therewith. The opposite end of the cylinder member 106 has a reduced diameter axial shaft portion 110 formed integral therewith or otherwise secured thereto which is rotatably supported in a bearing housing 112 affixed to a plate member 114 which is secured to the frame members 22 and 26. The spiral cam 104 is thus rotatably about its longitudinal axis with rotation of the spiral cam being selectively transmitted to the cross-shaft 84 through the one-way clutch 92 described above.

Referring to FIGS. 3 and 4, taken in conjunction with FIGS. 5 and 6, the spiral cam 104 is operatively associated with the mandrel carriage 30 is rotatably actuated in direct response to movement of the mandrel 34 between its first position removed from the work station and its second position wherein the mandrel is disposed within the work station to receive a length of tube stock thereon preparatory to cutting the tube stock into a plurality of shorter length segment as described. Cam follower means, indicated generally at 116, are supported by the mandrel carriage 30 and operatively coupled to the cam member 108 of the spiral cam 104. The cam follower means 116 includes a pair of spaced rollers 118 each rotatably supported on a stub shaft 120 affixed in normal relation to a support plate 122 such that the axes of the stub shafts 120 support the rollers 118 for rotation about parallel axes. The support plate 122 has a support shaft 124 secured thereto centrally of and parallel to the axes of the stub shafts 120. The support shaft 124 is snugly received and retained within an appropriate axial bore in a support arm 126 secured to the peripheral surface of the upper sleeve 32 of the mandrel carriage 30. The support shaft 124 is supported to allow limited rotation of the support plate 122 about the axis of its support shaft. The rollers 118 have annular concave radial surfaces adapted to firmly engage outer peripheral surface portions of the cylindrical cam member 108 for rolling engagement therealong. The pivotal support for the cam follower support plate 122 relative to the support arm 126 allows the rollers 118 and the associated supported plate 122 to rotate about the axes of support shaft 124 as necessary to accommodate variations in the angular relationship between the axis of cam member 108 relative to the axis of the cylindrical member 106 of the spiral cam 104 as best illustrated in FIG. 4.

In this manner, it can be seen that when the mandrel 34 is moved in a longitudinal direction through movement of the mandrel carriage 30 during actuation of the pneumatic cylinder-piston 44, the spiral cam 104 will be caused to rotate in direct response to movement of the cam follower 116. The particular configuration or curvature of the cam member 108 about the cylindrical member 106 of the spiral cam 104 is such that the spiral cam is caused to rotate rapidly during initial movement of the mandrel carriage 30 from its intermost second position as illustrated in FIG. 6 toward its rearward first position, as illustrated in FIG. 5. The curvature of the cam member 108 is further such that rotation of the spiral cam 104 is substantially slower as the mandrel carriage 30 approaches its first or rightmost end of travel as illustrated in FIG. 5. With a spiral cam configuration as described, it can be seen that when the mandrel carriage 30 is moved from right to left, considered in FIGS. 5 and 6, the spiral cam 104 will be rotated in a clockwise direction, as considered in FIG. 3. When the mandrel carriage 30 is moved from left to right, the spiral cam will be rotated in a counterclockwise direction, again considered in FIG. 3.

Having thus described the elements comprising the tube storage and feeding means 12 in conjunction with the tube-cutting machine 10, its operation will now be briefly reviewed. Assuming the storage bin 70 has a plurality of lengths of tube stock 54 disposed therein which are to be advanced to the work station defined by the guide brackets 48 and 50 for cutting the lengths of tube stock into shorter segments, the mandrel carriage 30 is reciprocated through control of the pneumatic cylinder-piston assembly 44 to advance a length of tube stock to the work station. As noted, the upper crossbar 84 will be rotated in a direction to advance the tube stock upwardly to the work station only when the mandrel carriage is moved from left to right, as considered in FIGS. 5 and 6, or during movement of the mandrel carriage from its second position toward its first described position. Movement of the mandrel carriage 30 from right to left is ineffective to advance the tube stock to the work station due to the one-way clutch 92 which acts in an overrunning manner when the spiral cam 104 is rotated in a clockwise direction, as considered in FIG. 3. During such rotation of the spiral cam 104, the one-way clutch 90 associated with the opposite end of the cross-shaft 84 from the clutch 92 prevents movement of the cross-shaft 84 in a direction which would reverse the direction of movement of the endless chains 98 and their associated tube lifting lugs 100. When a length of tube stock is advanced to a position wherein it drops into the work station defined by the guide brackets 48 and 50, the mandrel 34 is advanced to a position to receive and support the tube stock disposed within the work station, after which the slitter knives 60 of the cutting means 56 are brought into cutting relation with the peripheral surface of the tube stock for cutting the tube stock into a plurality of shorter segments in a known manner. Upon completion of severing or cutting a length of tube stock into a plurality of shorter length segments, the mandrel 34 is moved rearwardly toward its first position as shown in FIG. 5 allowing the shorter length cut segments to fall and be removed from the cutting machine. Conventional stripper means (not shown) are provided adjacent the upstanding support plate 16 adjacent the mandrel opening 36 to strip the cut tubular segments from the mandrel as it is retracted.

During movement of the mandrel carriage 30 toward its rearward position, the on next cam 104 will be caused to rotate in a counterclockwise direction to effect a simultaneous rotation of the upper cross-shaft 84 and advance a length of tube stock supported on the next below lugs 100 to the work station. It will be understood that the configuration of the cam member 108 about the cylinder 106 is such that the rotational movement imparted to the spiral cam 104 during movement of the mandrel carriage 30 toward its rearward or first position is sufficient to advance the length of tube stock disposed on next in line lift lugs 100 to the work station. In this manner, the lengths of tube stock 54 are sequentially advanced or fed to the work station of the cutting machine in direct relation to the movement of the mandrel 34 in a relatively simple and expedient manner.

While I have shown and described a preferred embodiment of my invention, it will be obvious to those skilled in the art that changes and modifications may be made therein without departing from the invention in its broader aspects.

I claim:

1. In a tube-cutting machine having a work station to receive and position individual elongated lengths of tube stock and the like and including a generally cylindrical mandrel longitudinally movable between a first position removed from the work station and a second position wherein it enters and supports a length of tube positioned in the work station; tube storage and feeding means for sequentially advancing lengths of tube stock to the work station, comprising, in combination, storage bin means adapted to store at least on length of tube stock preparatory to advancing the same to the work station, tube-advancing means operatively associated with said storage bin means and including a pair of rotatably supported spaced, parallel shafts, sprocket means secured to each of said shafts for rotation therewith, endless chain means reeved over said sprocket means for movement in a path about said spaced shafts, tube-lifting means associated with said chain means and adapted to releasably engage lengths of tubular stock disposed within said storage bin means, and drive means operatively associated with at least one of said shafts and adapted to effect selective rotary movement of said shafts in a direction to effect sequential advancement of lengths of tube stock from said storage bin means to the work station, said drive means including means operatively associated with the mandrel and actuated in response to movement of the mandrel between its first and second positions to effect said selective rotary movement of said shafts.

2. Tube storage and feeding means as defined in claim 1 including means interconnecting said drive means with said one of said shafts, said interconnecting means being effective to cause rotation of said shaft in a direction to effect sequential advancement of the lengths of tube stock only when the mandrel is moved from its second to its first positions.

3. Tube storage and feeding means as defined in claim 1 wherein said endless chain means includes a pair of endless chains supported in planes disposed normal to the axes of said shafts and spaced longitudinally therealong, and wherein said tube-lifting means comprise pairs of lifting lugs selectively spaced along the lengths of said chains, each pair of lugs being adapted to advance a length of tube stock toward the work station during an operative reciprocating cycle of the mandrel.

4. A machine as defined in claim 1 wherein the mandrel is supported on a mandrel carriage, and wherein said drive means includes cam means operatively associated with at least one of said spaced shafts and the mandrel carriage, said cam means being rotatably movable in direct response to movement of the mandrel to effect said selective rotary movement of said one of said shafts.

5. A machine as defined in claim 4 wherein the mandrel is supported for reciprocating movement in a direction parallel to the axis of a length of tubular stock when positioned in the work station, and wherein said cam means comprises a spiral cam operatively coupled to one of said shafts in parallel alignment therewith, said spiral cam being supported parallel to the direction of movement of the mandrel and having a length at least equal to the distance traveled by the mandrel during movement between said first and second positions.

6. A machine as defined in claim 5 including cam follower means supported by the mandrel carriage and operatively connected to said spiral cam in a manner to effect rotary movement of said spiral cam in direct relation to longitudinal movement of the mandrel.

7. A machine as defined in claim 6 wherein said spiral cam has a configuration to effect rapid rotation thereof during initial movement of the mandrel from its said second position to its said first position, said cam configuration effecting substantially slower rotation thereof as the mandrel approaches its first position in a direction from its said second position.

8. A machine as defined in claim 5 including means interconnecting said spiral cam and said one of said shafts such that driving rotational movement of said one of said shafts is effected only when the mandrel is moved in a direction from its said second position to its said first position.

9. A machine as defined in claim 8 wherein said interconnecting means comprises an overrunning clutch.

10. A machine as defined in claim 8 including means preventing rotational movement of said shafts in a direction opposite to said driving rotational movement.

11. A machine as defined in claim 1 wherein said storage bin means includes a tube stock support base inclined in a direction to urge the stored tube stock toward said tube-advancing means.

* * * * *